March 18, 1924.
R. GEORGE
1,487,231
FLOWERPOT HOLDER
Filed April 17, 1922
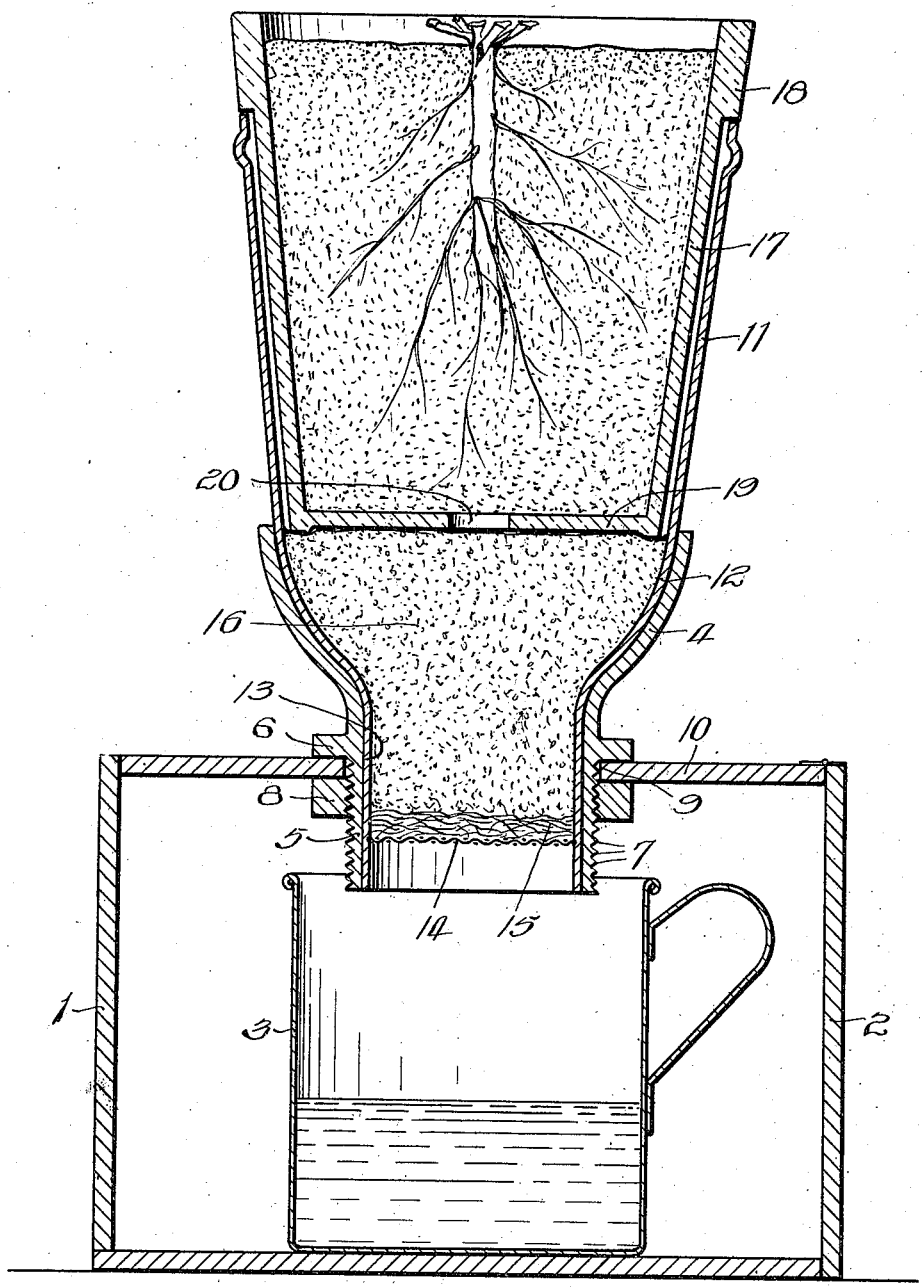
Inventor:
Rady George.
By Fred'k J. Larson
Attorney.

Patented Mar. 18, 1924.

1,487,231

UNITED STATES PATENT OFFICE.

RADY GEORGE, OF SPRINGFIELD, ILLINOIS.

FLOWERPOT HOLDER.

Application filed April 17, 1922. Serial No. 553,643.

*To all whom it may concern:*

Be it known that I, RADY GEORGE, a subject of the King of Bulgaria, residing at Springfield, in the county of Sangamon and State of Illinois, have invented certain new and useful Flowerpot Holders, of which the following is a specification.

My invention relates to a flower pot holder, and, has for its object to provide a simple, inexpensive and effective device for supporting a flower pot, thus obviating the necessity of employing a saucer to stand the flower pot in, the latter being objectionable for the reason that water draining from the flower pot is retained by the saucer and the soil in the flower pot is kept too wet, or where a saucer is not employed, the water drains from the flower pot and the soil becomes too dry and vice versa.

The object of my invention is to provide means for retaining the desired amount of moisture in the soil within the flower pot and no more, and, to provide an effective drain for the soil of the flower pot proper.

A further object of the invention is to provide a device which will be neat in appearance and conceal the wall of the flower pot from view.

With the above and other objects in view, the invention consists in novel features of construction, arrangement and combination of parts hereinafter more fully described and finally pointed out in the claims hereto appended.

Referring to the accompanying drawing forming a part of this specification, I have illustrated a holder especially designed to hold a flower pot, and, as set forth in the drawing, the reference character 1 designates a suitable box shaped receptacle having one of its side walls in the form of a hinge supported door 2. This box shaped receptacle 1 may be made from any material, be of suitable size, shape or design and acts as a closure for a suitable cup or liquid receptacle, or reservoir 3, as well as a base for the flower pot holder proper.

The reference numeral 4 indicates a cup shaped sleeve having a downwardly directed tubular portion 5 which is provided with a peripheral shoulder 6 and the external screw threads 7. The numeral 8 indicates a nut carried by the screw threaded portion 5 which portion passes through an opening 9 in the top wall 10 of the box shaped base 1 and directed a suitable distance into the box 1. The flange 6 rests upon the top face of the top 10 while the nut 8 engages the lower face of the top 10 for holding the cup shaped sleeve in a position directed upwardly from the top of the base 1, as shown.

The numeral 11 indicates a flower pot holder having the cup shaped section 12 to engage the inner walls of the cup shaped sleeve 4. The cup shaped section 12 terminates in a downwardly directed tubular section 13 which is receivable within the tubular portion 5 of the cup shaped sleeve 4, as shown. This arrangement supports the flower pot holder in position, as is manifest.

14 indicates a suitable screen which is carried by the tubular portion 13 of the flower pot holder and 15 represents a suitable layer of moss laid thereupon, while 16 indicates sand or suitable dirt which is disposed within the cup shaped section 12 of the flower pot holder upon the moss and screen carried by the lower or tubular portion 13 thereof. The screen holds the load of the sand or dirt 16, while the moss prevents the sand and dirt from falling through the screen 14, although water may pass therethrough to be caught by the cup or receptacle 3, as is manifest.

17 indicates a flower pot having the usual upper border flange 18 and its bottom wall 19 provided with the usual drainage opening 20. The bottom 19 of the flower pot 17 is adapted to be seated upon the sand or dirt 16 carried by the flower pot holder and the flower pot flange 18 is adapted to rest upon the upper edge of the flower pot holder, as shown, to take the weight of the flower pot off of the sand or dirt 16.

It is evident from the foregoing description, that I provide a flower pot holder which is neat in appearance, inexpensive to manufacture and which is highly efficient for the purpose intended. It is evident from the drawing that the soil within the flower pot, when watered too much, will be readily drained through the lower auxiliary layer of sand or soil and be deposited within the cup 3. The auxiliary layer of sand or soil 17 helps to maintain and retain the desired amount of moisture for the soil of the flower pot proper, as is manifest.

The many advantages of the herein described invention will readily suggest themselves to those skilled in the art to which it appertains.

I do not wish to be understood as having limited myself to the exact details of construction shown and described, but desire to have it understood that the invention I have shown in the drawing is merely illustrative, as it is manifest that various minor changes may be made in the form, shape and particular arrangement of parts without departing from the spirit of my invention, hence I reserve the right to make any such changes, or modifications as may fairly fall within the scope of the appended claims when fairly construed.

What I claim is:

1. In a flower pot holder structure, a hollow base having a door, said base adapted to receive and conceal a removable water drain receptacle, a sleeve fixed to the top wall of the hollow base, a flower pot holder terminating at its lower end in a tubular drain neck having its lower end open, said drain neck passing through the sleeve and extending into the base a short distance above the water drain receptacle carried therein and a screen disposed within said drain neck near the lower end thereof to act as a floor for moss and sand adapted to be deposited within the drain neck of the flower pot holder.

2. In a flower pot holder structure, a hollow base having a door, said base adapted to receive and conceal a removable water drain receptacle, a sleeve passing through the top wall of the base and having a flange to engage the upper face of the top wall, external screw threads formed upon said neck, a nut for engagement with said screw threads to lock the sleeve in fixed relation with the top wall of the base, a flower pot holder terminating at its lower end in a tubular drain neck having its lower end open, said drain neck passing through the sleeve and extending into the base a short distance above the water drain receptacle carried therein, and a screen disposed within said drain neck near the lower end thereof to act as a floor for moss and sand adapted to be deposited within the drain neck of the flower pot holder.

In testimony whereof, I have hereunto signed my name to the specification.

RADY GEORGE.